United States Patent [19]

Winter et al.

[11] Patent Number: 4,962,262

[45] Date of Patent: Oct. 9, 1990

[54] 1-OLEFIN POLYMER WAX, AND A PROCESS FOR THE PREPARATION THEREOF

[75] Inventors: Andreas Winter, Kelkheim; Martin Antberg, Hofheim am Taunus; Jürgen Rohrmann, Neufahrn, all of Fed. Rep. of Germany

[73] Assignee: Hoechst Aktiengesellschaft, Frankfurt, Fed. Rep. of Germany

[21] Appl. No.: 286,743

[22] Filed: Dec. 19, 1988

[30] Foreign Application Priority Data

Dec. 21, 1987 [DE] Fed. Rep. of Germany ....... 3743321

[51] Int. Cl.$^5$ .......................... C10L 1/16; C07C 2/24; C07C 2/02
[52] U.S. Cl. ........................................ 585/512; 585/9; 585/522; 585/523; 585/524
[58] Field of Search .................... 585/9, 512, 523, 522, 585/524

[56] References Cited

U.S. PATENT DOCUMENTS

| | | |
|---|---|---|
| 4,522,982 | 6/1985 | Ewen . |
| 4,542,199 | 9/1985 | Kaminsky et al. ................ 526/160 |
| 4,704,491 | 11/1987 | Tsutsui et al. ..................... 585/512 |
| 4,769,510 | 9/1988 | Kaminsky et al. ................ 585/512 |

FOREIGN PATENT DOCUMENTS

| | | |
|---|---|---|
| 0021700 | of 1981 | European Pat. Off. . |
| 3148229 | 6/1983 | Fed. Rep. of Germany . |
| 3640984 | 5/1988 | Fed. Rep. of Germany . |
| 59-206409 | 11/1984 | Japan . |

OTHER PUBLICATIONS

T. Tsutsui, "Production of Ethylene Wax", Mar. 14, 1987, vol. 11, No. 85 (C410) (2532) (Abstract of JP-A 61/236804 of Oct. 22, 1986.).

W. Kaminsky, "Stereoselektive Polymerization von Olefinen mit Homogenen, Chiralen Ziegler-Natta-Katalysatoren", Angew. Makromol. Chem., 145/146, 149-160 (1986).

Primary Examiner—H. M. S. Sneed
Assistant Examiner—J. Saba

[57] ABSTRACT

1-Olefin polymer waxes having a very narrow molecular weight distribution, high isotacticity, a narrow grain size distribution and a high bulk density are obtained by means of a catalyst comprising a chiral, stereorigid metallocene compound and an aluminoxane, in the presence of small amounts of hydrogen during the polymerization.

14 Claims, No Drawings

1-OLEFIN POLYMER WAX, AND A PROCESS FOR THE PREPARATION THEREOF

The invention relates to a 1-olefin polymer wax of high isotacticity, of narrow molecular weight distribution $M_w/M_n$ and of excellent grain morphology, and to a process for the preparation thereof.

The preparation of polyolefin waxes of relatively high isotacticity (Isotactic Index 80 to 85%, melt enthalpy 63 J/g, mixtures of atactic and isotactic polyolefin chains) by means of a supported catalyst, a cocatalyst and a stereoregulator at temperatures of greater than 95° C. is known (cf. DE-A 3,148,229). However, it is necessary to employ large amounts of hydrogen as molecular weight regulators since catalyst systems of this type develop their greatest activity in the area of high-molecular-weight polyolefin plastics. In order to achieve the degrees of polymerization which are typical of waxes, propylene:hydrogen partial pressure ratios of <1 are required.

Furthermore, an MgCl$_2$-supported catalyst is known which results in crystalline PP waxes having a narrow molecular weight distribution (cf.JP 59/206,409). However, this catalyst also has the typical disadvantages of catalyst systems developed for the preparation of high-molecular-weight polyolefin plastics and which thus have a very poor response to hydrogen. Very large amounts of hydrogen are necessary to prepare waxes. This results in a poor space-time yield and low activity. Furthermore, an undesired mixture of isotactic and atactic chains is also present here in the wax product.

In addition, it is known that hydrogenation of propylene to propane occurs to a significant extent at such high hydrogen/propylene ratios under Ziegler polymerization conditions, which results in considerable loss of propylene.

Due to the low catalyst activities under the reaction conditions necessary, relatively high chlorine contents of, in some cases, greater than 1,000 ppm are found in the polymer waxes if the catalyst residues are not removed by specific aftertreatment.

The preparation of isotactic PP using a soluble, stereorigid, chiral Zr compound and an aluminoxane is also known (cf. EP-A 185,918). A polymer having a narrow molecular weight distribution, which is advantageous for certain areas of application, for example for high-performance injection molding, is obtained. At the same time, the catalyst system has a number of problems. Due to the low activity, complex purification of the polymer is necessary to remove the large residual amounts of catalyst. The bulk density of the polymer is too low, and the grain morphology and the grain size distribution are unsatisfactory.

A specific pre-activation method of metallocene using an aluminoxane has also been proposed; this results in a considerable increase in the activity of the catalyst system and in a significant improvement in the grain morphology of the polymer (cf. DE 3,726,067).

It is furthermore known from the literature that the molecular weight of polyolefins prepared using metallocene/aluminoxane can be controlled via the polymerization temperature. Specifically, a high polymerization temperature results in a low molecular weight. Experiments have now shown that, in the case of metallocene/aluminoxane catalysts, the temperature range available in industry is not sufficient to include and cover the important molecular weight range for wax types. A further disadvantage for the use of polyolefins prepared by means of metallocene/aluminoxane systems is the fact that the chain ends produced on chain termination always contain an unsaturated group.

It is known from the literature that organometallic compounds, such as, for example, AlR$_3$ or ZnR$_2$, are capable of initiating chain-termination reactions, even in combination with metallocene/aluminoxane systems. However, experiments have shown that the catalyst activities usually fall drastically and, in addition, the undesired residual ash content in the wax increases greatly due to the necessary addition of relatively large amounts of these molecular weight regulators. Only Al(CH$_3$)$_3$ allows the catalyst activity to increase, but its action as a molecular weight regulator is unsatisfactory and the necessary use of large amounts likewise results in an increase in the residual ash content in the polymer.

The object was to find a process using which polyolefin waxes containing saturated chain ends can be prepared in direct synthesis using metallocene/aluminoxane catalysts.

It has been found that the object can be achieved when hydrogen is used as the molecular weight regulator.

The invention thus relates to a 1-olefin polymer wax comprising units derived from a 1-olefin of the formula RCH=CH$_2$ in which R denotes an alkyl radical having 1 to 28 carbon atoms, having a molecular weight $M_w$ of from 1,000 to 25,000, a molecular weight distribution $M_w/M_n$ of from 1.8 to 4.0, a viscosity number of from 2 to 60 cm$^3$/g, a melting range of from 120 to 160° C., a melt enthalpy $\Delta H$ of greater than 80 J/g, a drip point range of from 120 to 160° C. and a melt viscosity of from 100 to 20,000 mPa.s at 170° C. Various metallocene catalysts can be used for the process according to the invention.

Stereorigid, chiral metallocenes are used for the preparation of 1-olefin polymer waxes of high isotacticity. These metallocenes are, for example, those of the formula (I)

In this formula,

Me is a metal from group IVb or Vb of the Periodic Table of the Elements, i.e. titanium, zirconium, hafnium, vanadium, niobium or tantalum, preferably titanium, zirconium hafnium, in particular zirconium and hafnium $R^1$ and $R^2$ are identical or different and denote a $C_1$-$C_{10}$-, preferably $C_1$-$C_3$-alkyl group, a $C_6$-$C_{10}$-, preferably $C_6$-$C_8$-aryl group, a $C_2$-$C_{10}$-, preferably $C_2$-$C_4$-alkenyl group, a $C_7$-$C_{40}$-, preferably $C_7$-$C_{10}$-aralkyl group, a $C_8$-$C_{40}$-, preferably $C_8$-$C_{12}$-aralkenyl group or a halogen atom, preferably chlorine.

$R^3$ is a linear $C_1$-$C_4$-, preferably $C_1$-$C_3$-hydrocarbon radical or a cyclic $C_4$-$C_6$-hydrocarbon radical; these hydrocarbon radicals may contain at least one heteroatom in the chain as a bridging unit. $R^3$ may alternatively comprise one or up to four heteroatoms whose further valences are satisfied by hydrocarbon radicals, hydrogen or halogen atoms.

Examples of single-membered bridging units are —CR$_2$—, —O—, —S—, —SO—, —Se—, —SeO—, —NR$^6$—, —PR$^6$—, —AsR$^6$—, —BR$^6$—, —AlR$^6$—, —SiR$^6{}_2$—, —GeR$^6{}_2$—, and —SnR$^6{}_2$—, where R$_6$ is a hydrogen atom, a C$_1$-C$_{10}$-, preferably C$_1$-C$_4$-alkyl group, a C$_6$-C$_{10}$-, preferably C$_6$-C$_8$-aryl group, a C$_2$-C$_{10}$-, preferably C$_2$-C$_4$-alkenyl group, a C$_7$-C$_{40}$-, preferably C$_7$-C$_{10}$-aralkyl group, a C$_8$-C$_{40}$-, preferably C$_8$-C$_{12}$-aralkenyl group or a halogen atom, preferably chlorine or bromine. The hydrocarbon radicals R$^6$ may also be hetero-atom-substituted. —CR$^6{}_2$— and silicon- and sulfur-containing bridging units are preferred.

Examples of two-membered bridging units are —(CR$^6{}_2$)$_2$—, —SS—, —SeSe—, —SiR$^6{}_2$SiR$^6{}_2$— and —SiR$^6{}_2$CR$^6{}_2$—.

Examples of multi-membered bridging units are —(CR$^6{}_2$)$_3$—, —(CR$^6{}_2$)$_4$—, —SiR$^6{}_2$OSi$^6{}_2$R—, —SiR$^6{}_2$(CR$^6{}_2$)$_n$SiR$^6{}_2$—SiR$^6{}_2$(CR$^6{}_2$)$_n$—, —S(CR$^6{}_2$)$_n$S—, —S(CR$^6{}_2$)$_n$—, —NR$^6$—(CR$^6{}_2$)$_n$NR$^6$——NR$^6$(R$^6{}_2$)$_n$—, —PR$^6$(CR$^6{}_2$)PR$^6$—, —PR$^6$(CR$^6{}_2$)$_n$—where n=1 or 2, and —AlR$^6$OAlR$^6$—, where R$^6$ has the abovementioned meaning. —(CR$_2$)$_2$— and silicon- and sulfur-containing bridging units are preferred.

R$^4$ and R$^5$ are identical or different, preferably identical. They are mononuclear or polynuclear hydrocarbon radicals which are capable of forming a sandwich structure together with the central atom. Examples of such radicals are the indenyl, tetrahydroindenyl or cyclopentadienyl group and heteroaromatic ligands. Particularly preferred metallocenes are bisindenyldimethylsilylzirconium dichloride, ethylenebisindenylzirconium dichloride and ethylenebisindenylhafnium dichloride.

The optically active metallocenes are employed as the racemate. However, it is also possible to use the pure D- or L-form. Optically active wax can be prepared using these pure stereoisomeric forms. However, the meso-form of the metallocenes must be removed, since the polymerization-active center (the metal atom) in these compounds is no longer chiral due to mirror symmetry at the central metal. Separation of the stereoisomers is known in principle.

The stereorigid, chiral metallocenes described above can be prepared by the following reaction route:

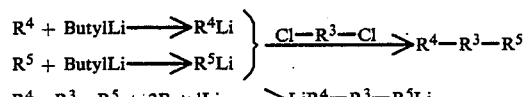

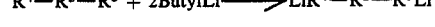

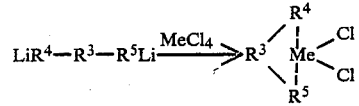

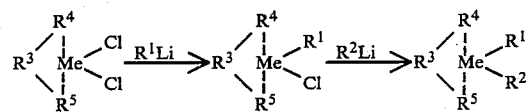

Before use in the polymerization reaction, the metallocene is pre-activated using an aluminoxane. This aluminoxane is a compound of the formula II

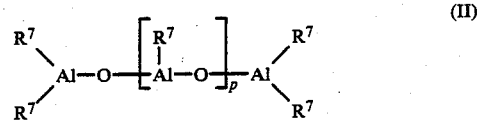

for the linear type and/pr of the formula (III)

for the cyclic type. In these formulae, R$^7$ denotes a C$_1$-C$_6$-alkyl group, preferably methyl, ethyl or isobutyl, in particular methyl, and p denotes an integer from 5 to 40, preferably 15 to 35.

The aluminoxane can be prepared in various ways.

In one of the processes, finely powdered copper sulfate pentahydrate is slurried in toluene, and sufficient trialkylaluminum is added in a glass flask under an inert gas at about $-20°$ C. such that about 1 mole of CuSO$_4$.5H$_2$O is available for each 4 Al atoms. After slow hydrolysis with elimination of alkane, the reaction mixture is left at room temperature for 24 to 48 hours, cooling sometimes being necessary so that the temperature does not exceed 30° C. The aluminoxane dissolved in toluene is subsequently separated from the copper sulfate by filtration, and the toluene is removed by distillation in vacuo. It is assumed that the low-molecular-weight aluminoxanes condense in this preparation process to form higher oligomers with elimination of trialkylaluminum. In addition, aluminoxanes are obtained when trialkylaluminum, preferably trimethylalumium, dissolved in an inert aliphatic or aromatic solvent, preferably heptane or toluene, is reacted at a temperature of $-20$ to 100° C. with aluminum salts containing water of crystallization, preferably aluminum sulfate. In this case, the volume ratio between the solvent and the alkylaluminum used is 1:1 to 50:1 —preferably 5:1 —and the reaction time, which can be monitored by elimination of the alkane, is 1 to 200 hours —preferably 10 to 40 hours.

Of the aluminum salts containing water of crystallization, those are used, in particular, which have a high content of water of crystallization. Aliminum sulfate hydrate is particularly preferred, above all the compounds Al$_2$(SO$_4$)$_3$.18H$_2$O and Al$_2$(SO$_4$)$_3$.16H$_2$O having the particularly high water of crystallization content of 18 and 16 moles of H$_2$O/mole of Al$_2$(SO$_4$)$_3$ respectively.

The pre-activation is carried out in solution, with the metallocene preferably being dissolved in a solution of the aluminoxane in an inert hydrocarbon. Suitable inert hydrocarbons are aliphatic and aromatic hydrocarbons. Toluene is preferably used.

The concentration of the aluminoxane in the solution is in the range from about 1% by weight to the saturation limit, preferably from 5 to 30% by weight, in each case based on the total solution. The metallocene can be employed in the same concentration, but is preferably employed in an amount of from 10$^{-4}$ to 1 mole per mole of aluminoxane. The pre-activation time is 5 minutes to 60 minutes, preferably 10 to 20 minutes.

Significantly longer pre-activation is possible, but normally neither increases the activity nor decreases the activity and has no effect, in particular, on the molecular weight of the polyolefin wax produced, but may be thoroughly appropriate for storage purposes.

The pre-activation is carried out at a temperature of from −78 to 100° C., preferably 0 to 70° C.

The pre-activation can be carried out either with exclusion of light or under the action of light since the metallocenes, which are generally photosensitive, are stabilized by the aluminoxane. It is nevertheless preferred to exclude direct incidence of light, particularly at relatively long pre-activation times and in the case of particularly sensitive heteroatom-substituted metallocenes.

The second component of the catalyst to be used according to the invention is an aluminoxane of the formula (II) and/or (III). Preferably, the same aluminoxane is used for pre-activation and for polymerization.

The catalyst to be used according to the invention is employed for polymerization of 1-olefins of the formula R—CH=CH$_2$ in which R denotes an alkyl radical having 1 to 28 carbon atoms, preferably 1 to 10 carbon atoms, in particular one carbon atom, for example propylene, 1-butene, 1-hexene, 4-methyl-1-pentene and 1-octene. Propylene is particularly preferred. Furthermore, the catalyst is also employed for copolymerization of these olefins with one another and with ethylene, it being possible to copolymerize more than 50% by weight of ethylene.

The polymerization is carried out in a known manner in liquid monomers, in solution, in suspension or in the gas phase, continuously or batchwise, in one or more steps, at a temperature of −50 to 200° C., preferably −20 to 120, in particular −20 to 80° C.

The catalyst system to be used according to the invention has an unexpectedly high sensitivity to hydrogen.

Hydrogen is added as a molecular weight regulator. The hydrogen partial pressure in this case is between 0.05 and 50 bar, preferably 0.1 to 25 bar, in particular 0.2 to 10 bar. The 1-olefin:hydrogen molar ratio is thus 3 to 3,000, preferably 6 to 1,500, in particular 15 to 300.

The overall pressure in the polymerization system is thus 0.5 to 120 bar. Polymerization in the pressure range from 5 to 100 bar, which is particularly interesting in industry, is preferred.

The metallocene compound is used in a concentration, based on the transition metal, of from $10^{-3}$ to $10^{-7}$, preferably $10^{-4}$ to $10^{-6}$, mole of transition metal per dm$^3$ of solvent or per dm$^3$ of reactor volume. The aluminoxane is used in a concentration of from $10^{-4}$ to $10^{-1}$ mole, preferably $10^{-3}$ to $2 \times 10^{-2}$ mole per dm$^3$ of solvent or per dm$^3$ of reactor volume. In principle, however, higher concentrations are also possible. It is advantageous to firstly stir the aluminoxane into the polymerization system for a few minutes together with the polymerization liquid phase before adding the metallocene. The stirring time is preferably 10 to 30 minutes. However, shorter stirring times are also possible without suffering to any great extent, and a longer stirring time has no notable effect on the polymerization result.

The polymerization is carried out in an inert solvent which is customary for the low-pressure Ziegler process, for example in an aliphatic or cycloaliphatic hydrocarbon; examples which may be mentioned are butane, pentane, hexane, heptane, isooctane, cyclohexane and methylcyclohexane. In addition, it is possible to use a petroleum or hydrogenated diesel oil fraction which has been carefully freed from oxygen, sulfur compounds and moisture. Toluene can also be used. The monomer to be polymerized is preferably employed as a solvent or suspending agent.

The duration of polymerization is as desired since the catalyst system to be used according to the invention only exhibits a low time-dependent decrease in the polymerization activity. In the process according to the invention, the use of hydrogen as a molecular weight regulator results in a drastic increase in the catalyst activity. At the same time, the molecular weight can be controlled precisely in desired range. The polymers formed have a high chemical uniformity; the molecular weight distribution $M_w/M_n$ here is extremely narrow, with values between 1.8 and 4.0. This results in sharp melting points and solidification points. The use according to the invention of hydrogen at the same time results in a significant reduction in the residual ash content. Using the process according to the invention, it is furthermore possible to prepare a polyolefin wax which is highly isotactic and highly crystalline, and is thus distinguished by particular hardness. In general, the chain ends are built up from saturated hydrocarbon groups. Using the process according to the invention, it is possible to prepare colorless, transparent waxes which comprise compact spherical particles having a narrow grain size distribution and a high bulk density. The wax powder is distinguished by very good free-flowing properties and can thus be handled very well. The polyolefin wax according to the invention thus represents a new class of materials. It has a molecular weight of from 1,000 to 25,000, preferably 2,000 to 10,000, a molecular weight distribution $M_w/M_n$ of from 1.8 to 4.0, preferably 1.8 to 3.0, a viscosity number of from 2 to 60 cm$^3$/g, a melting range of from 120 to 160, preferably 125 to 155° C., a melt enthalpy $\Delta H$ of greater than 80, preferably greater than 100, J/g, a drip point range of from 120 to 160° C. and a melt viscosity of from 100 to 20,000, preferably 100 to 10,000, mPa.s at 170° C.

The examples below are intended to illustrate the invention. In these examples:

VN=viscosity number in cm$^3$/g $M_w$=weight average molecular weight} determined $M_n$=number average molecular weight} by gel-permeation $M_w/M_n$=molecular weight distribution} chromatography BD=bulk density of the polymer powder in g/dm$^3$ II=isotactic index, determined by $^{13}$C NMR spectroscopy MV=melt viscosity, determined by means of a rotation viscosimeter at 170° C.

EXAMPLE 1

A dry 16 dm$^3$ reactor was flushed with nitrogen and filled with 80 dm$^3$ (s.t.p.) (corresponding to 5 bar) of hydrogen and with 10 dm$^3$ of liquid propylene. 70 cm$^3$ of a toluene solution of methylaluminoxane (corresponding to 68 mmol of Al, mean degree of oligomerization n of the methylaluminoxane =30) were then added, and the batch was stirred at 30° C. for 15 minutes.

In parallel, 9 mg (0.02 mmol) of bisindenyldimethylsilylzirconium dichloride were dissolved in 35 cm$^3$ of a toluene solution of methylaluminoxane (34 mmol of Al) and preactivated by standing for 15 minutes. The orange-red solution was then introduced into the reactor. The polymerization system was heated to a temperature of 70° C. and then kept at this temperature for 30 minutes by appropriate cooling.

2.88 kg of polypropylene wax were obtained. The activity of the metallocene was thus 286.7 kg of PP wax/mmol of Zr $\times$ h or 640 kg of PP wax/g of metallocene $\times$ h.

VN=22.4 cm$^3$/g; $M_w$=6660, $M_n$=2870, $M_w/M_n$=2.3;

BD=536 g/dm$^3$; II=97.1%;

no unsaturated chain ends (determined by $^{13}$C NMR); drip point=143° C.; MV=142 mPa.s.

DSC measurement (20° C./min heating/cooling): melting point 142° C., melt enthalpy $\Delta H$=101.4 J/g, recrystallization point: 100° C.; half-value widths melting peak =8° C., recrystallization peak=7° C.

EXAMPLE 2

The procedure was analogous to Example 1, but 40 dm$^3$ (s.t.p.) (corresponding to 2.5 bar) of hydrogen were introduced into the reactor in place of the 80 dm$^3$ (s.t.p.) (corresponding to 5 bar) of hydrogen.

2.44 kg of polypropylene wax were obtained. The activity of the metallocene was thus 242.9 kg of PP wax/mmol of Zr $\times$ h or 542 kg of PP wax/g of metallocene $\times$ h.

VN=24.3 cm$^3$/g; $M_w$=8300, $M_n$=3230, $M_w/M_n$=2.6;

BD=470 g/dm$^3$; II=97.4%; no unsaturated chain ends; drip point 144° C.;

MV=239 mPa.s; DSC measurement (20° C./min heating/cooling): melting point 143° C., melt enthalpy $\Delta H$=104.2 J/g, recrystallization point: 98° C.; half-value widths melting peak=8° C., recrystallization peak=6° C.

EXAMPLE 3

The procedure was analogous to Example 1, but 16 dm$^3$ (s.t.p.) (corresponding to 1 bar) of hydrogen were introduced into the reactor in place of the 80 dm$^3$ (s.t.p.) (corresponding to 5 bar) of hydrogen.

2.35 kg of polypropylene wax were obtained. The activity of the metallocene was thus 234 kg of PP wax/mmol of Zr $\times$ h or 522 kg of PP wax/g of metallocene $\times$ h.

VN=31.9 cm$^3$/g; $M_w$=10,900, $M_n$=3700, $M_w/M_n$=2.9;

BD=498 g/dm$^3$; II=97.9% no unsaturated chain ends; drip point=143° C.,

MV=760 mPa.s; DSC measurement (20° C./min heating/cooling): melting point 142° C., melt enthalpy $\Delta H$=100.5 J/g, recrystallization point: 100° C.; half-value widths melting peak=7° C., recrystallization peak=7° C.

EXAMPLE 4

The procedure was analogous to Example 1, but 8 dm$^3$ (s.t.p.) (corresponding to 0.25 bar) of hydrogen were introduced into the reactor in place of the 80 dm$^3$ (s.t.p.) (corresponding to 5 bar) of hydrogen.

2.10 kg of polypropylene wax were obtained. The activity of the metallocene was thus 209.0 kg of PP wax/mmol of Zr $\times$ h or 467 kg of PP wax/g of metallocene $\times$ h.

VN=34.5 cm$^3$/g; $M_w$=13,700, $M_n$=4540, $M_w/M_n$=3.0;

BD=473 g/dm$^3$; II=97.0%;

no unsaturated chain ends; drip point=144° C.;

MV=1307 mPa.s; DSC measurement (20° C./min heating/cooling): melting point 141° C., melt enthalpy $\Delta H$=106.7 J/g, recrystallization point: 97.5° C., half-value widths melting peak=6.5° C., recrystallization peak=6° C.

COMPARATIVE EXPERIMENT A

The procedure was analogous to Example 1, but no hydrogen was introduced into the reactor in place of the 80 dm$^3$ (s.t.p.) (corresponding to 5 bar) of hydrogen.

1.62 kg of polypropylene were obtained. The activity of the metallocene was thus 161.2 kg of PP/mmol of Zr $\times$ h or 360 kg of PP/kg of metallocene $\times$ h.

VN=49.1 cm$^3$/g; $M_w$=42,000, $M_n$=16,800, $M_w/M_n$=2.5;

BD=492 g/dm$^3$; II=97.0%;

one unsaturated chain end per polypropylene chain (determined by $^{13}$C NMR).

EXAMPLE 5

The procedure was analogous to Example 1, but 40 Ndm$^3$ (s.t.p.) (corresponding to 2.5 bar) of hydrogen were introduced into the reactor in place of the 80 Ndm$^3$ (s.t.p.) (corresponding to 5 bar) of hydrogen. In addition, 8.4 mg (0.02 mmol) of ethylenebisindenylzirconium dichloride were used in place of the 9 mg (0.02 mmol) of bisindenyldimethylsilylzirconium dichloride.

2.59 kg of polypropylene wax were obtained. The activity of the metallocene was thus 259.0 kg of PP wax/mmol of Zr $\times$ h or 617 kg PP wax/g of metallocene $\times$ h.

VN=12.8 cm$^3$/g; $M_w$=6170, $M_n$=2810, $M_w/M_n$=2.2;

BD=447 g/dm$^3$; II=96.4%;

no unsaturated chain ends; drip point=142° C.;

MV=133 mPa.s;

DSC measurement (20° C./min heating/cooling): melting point 137° C., melt enthalpy $\Delta H$=105.8 J/g, recrystallization point: 97° C.; half-value widths melting peak =8° C., recrystallization peak=6° C.

COMPARATIVE EXPERIMENT B

Example 5 was repeated, but no hydrogen was used.

1.98 kg of polypropylene were obtained. The activity of the metallocene was thus 198 kg of PP/mmol of Zr $\times$ h or 471 kg of PP/g of metallocene $\times$ h.

VN=35 cm$^3$/g; $M_w$=25,500, $M_n$=11,200, $M_w/M_n$=2.3;

BD=485 g/dm$^3$; II=97.1%;

one unsaturated chain end per polypropylene chain.

EXAMPLE 6

A dry 16 dm$^3$ reactor was flushed with nitrogen and filled with 40 dm$^3$ (s.t.p.) (corresponding to 2.5 bar) of hydrogen and 10 dm$^3$ of liquid propylene. 70 cm$^3$ of a toluene solution of methylaluminoxane (corresponding to 68 mmol of Al, mean degree of oligomerization n=30) were then added, and the batch was stirred at 30° C. for 15 minutes.

In parallel, 24 mg (0.047 mmol) of ethylenebisindenylhafnium dichloride were dissolved in 35 cm$^3$ of a toluene solution of methylaluminoxane (34 mmol of Al) and preactivated by standing for 15 minutes. The yellow solution was then introduced into the reactor. The polymerization system was heated to a temperature of 60° C. and then kept at this temperature for 5 hours by appropriate cooling.

3.05 kg of polypropylene wax were obtained. The activity of the metallocene was thus 12.9 kg of PP wax/mmol of Hf ×h or 25.4 kg of PP wax/g of metallocene×h.

VN=13.4 cm$^3$/g; $M_w$=6340, $M_n$=2680, $M_w/M_n$=2.4;

BD=425 g/dm$^3$; II=98.1%;

no unsaturated chain ends; drip point=139° C.;

MV=193 mPa.s; DSC measurement (20° C./min heating/cooling): melting point 137° C., melt enthalpy ΔH=97.5 J/g, recrystallization point: 97° C.; half-value widths melting peak=9° C., recrystallization peak=7° C.

COMPARATIVE EXPERIMENT C

Example 6 was repeated, but no hydrogen was used.

2.03 kg of polypropylene were obtained. The activity of the metallocene was thus 8.5 kg of PP/mmol of Hf×h or 16.9 kg of PP/g of metallocene×h.

VN=95.0 cm$^3$/g; $M_w$=102,100, $M_n$=50,650, $M_w/M_n$=2.0;

BD=410 g/dm$^3$; II=97.7%; one unsaturated chain end per polypropylene chain.

COMPARATIVE EXPERIMENT D

A dry 16 dm$^3$ reactor was flushed with nitrogen and filled with 10 dm$^3$ of liquid propylene. 50 mmol of trimethylaluminum in 50 cm$^3$ of toluene and 70 cm$^3$ of a toluene solution of methylaluminoxane (corresponding to 68 mmol of Al, mean degree of oligomerization n=30) were added, and the batch was stirred at 30° C. for 15 minutes.

The remainder of the procedure was as in Example 1. 2.75 kg of polypropylene were obtained. The activity of the metallocene was thus 273.8 kg of PP/mmol of Zr×h or 611 kg of PP/g of metallocene×h.

VN=34.9 cm$^3$/g; $M_w$=24,350, $M_n$=8700, $M_w/M_n$=2.8.

The experiment shows that, although the molecular weight can be reduced in a certain manner using AlMe$_3$, the level of the H$_2$ experiments, however, is not achieved. At the same time, however, the residual ash content increases.

COMPARATIVE EXPERIMENT E

Comparative experiment D was repeated, but 50 mmol of Al triethyl were used in place of the 50 mmol of trimethyl aluminum, and the polymerization duration was extended to 2 hours.

Polypropylene was only formed in traces. The isolated solid was predominantly decomposition products of aluminoxane or of Al triethyl.

COMPARATIVE EXPERIMENT F

Comparative experiment D was repeated, but 50 mmol of Zn(C$_2$H$_5$)$_2$ were used in place of the 50 mmol of Al(CH$_3$)$_3$, and the polymerization duration was extended to 2 hours.

0.21 kg of polypropylene were obtained. The activity of the metallocene was thus 5.2 kg of PP/mmol of Zr×h or 11.7 kg of PP/g of metallocene×h.

VN=27.9 cm$^3$/g; $M_w$=14,900, $M_n$=5750, $M_w/M_n$=2.6. Due to the high residual ash content (about 4.8% by weight), it was not possible to prepare a clear, colorless melt from this product, and the product was thus unsuitable for a wax application.

We claim:

1. A process for the preparation of a 1-olefin polymer wax comprising units derived from a 1-olefin of the formula RCH=CH$_2$ in which R denotes an alkyl radical having 1 to 28 carbon atoms, having a molecular weight $M_w$ of from 1,000 to 25,000, a molecular weight distribution $M_2/M_n$ of from 1.8 to 4.0, a viscosity number of from 2 to 60 cm$^3$/g and a melting range of from 120 to 160° C., a melt enthalphy H of greater than 80 J/g, a drip point range of from 120 to 160° C. and a melt viscosity of from 100 to 20,000 mPa.s at 170° C., by polymerization of a 1-olefin of the formula R—CH=CH$_2$ in which R is an alkyl group having 1 to 28 carbon atoms, or copolymerization of this olefin with ethylene at a temperature of from −60 to 200° C., at a pressure of 0.5 to 120 bar, in solution, in suspension or in the gas phase, in the presence of a catalyst comprising a transition metal compound and an activator, a metallocene being the transition metal compound and an aluminoxane being the activator, which process comprises: carrying out the polymerization in the presence of a catalyst whose transition metal component is a metallocene of the formula (I)

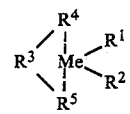

in which

Me is a metal from group IVb or Vb of the Periodic Table of the Elements,

R$^1$ and R$^2$ are identical or different and denote a C$_1$-C$_{10}$ alkyl group, a C$_6$-C$_{10}$-aryl group, a C$_2$-C$_{10}$-alkenyl group, a C$_7$-C$_{40}$-aralkyl group, a C$_8$-C$_{4}$--aryl-alkenyl group or a halogen atom, R$^3$ is a linear C$_1$-C$_4$-or a cyclic C$_4$-C$_6$-hydrocarbon radical which optionally contains at least one heteroatom in the chain as a bridging unit;

R$^4$ and R$^5$ are identical or different and denote a mononuclear or polynuclear hydrocarbon radical which is capable of forming a sandwich structure together with the central atom;

5 minutes to 60 minutes before the polymerization, pre-activating said metallocene at a temperature of from −78 to 100° C. using an aluminoxane of the formula (II)

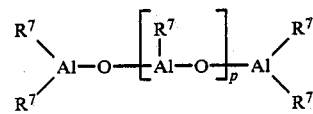

for the linear type and/or of the formula (III)

for the cyclic type, where, in the formulae II and III, R$^7$ denotes a C$_1$-C$_6$-alkyl group and p is an integer from 5 to 40, and where the activator is likewise an aluminoxane of the formula II or III; and, during the polymerization, adding hydrogen in the 1-olefin:H$_2$ molar ratio from 3 to 3,000.

2. The process of claim 1, wherein said Me denotes titanium, zirconium, hafnium, vanadium, niobium or tantalum.

3. The process of claim 1, wherein said $R^1$ and $R^2$ which are identical or different denote a $C_1$-$C_3$ alkyl group, $C_6$-$C_8$ aryl group, $C_2$-$C_4$ alkenyl group, $C_7$-$C_{10}$ aralkyl group, $C_8$-$C_{12}$ aralkenyl group, or chlorine.

4. The process of claim 1, wherein said $R^3$ is a linear $C_1$-$C_3$ hydrocarbon radical containing at least one heteroatom in the chain as a bridging unit.

5. The process of claim 1, wherein said $R^4$ and $R_5$ are identical.

6. The process of claim 1, wherein said mononuclear or polynuclear hydrocarbon radical is of the indenyl, tetrahydroindenyl, or cyclopentadienyl group and heteroaromatic ligands.

7. The process of claim 1, wherein said metallocene is bisindenyldimethylsilylzirconium dichloride, ethylenebisindenylzirconium dichloride, or ethylenebisindenylhanium dichloride.

8. The process of claim 1, wherein said $R^7$ denotes methyl, ethyl or isobutyl, and said p is an integer from 15 to 35.

9. The process of claim 1, wherein said metallocene has been pre-activated before polymerization for 10 to 20 minutes.

10. The process of claim 1, wherein said metallocene has been pre-activated at a temperature ranging from 0 to 70° C.

11. The process of claim 1, wherein said copolymerization polymerization occurs at a temperature ranging from $-20°$ C. to 120 ° C. said pressure ranging from 5 to 100 bar, and said olefin: $H_2$ molar ratio ranges from 6 to 1,500.

12. The process of claim 1, wherein said copolymerization polymerization occurs at a temperature ranging from $-20$ to 80° C., said pressure ranging from 5 to 100 bar, and said olefin: $H_2$ molar ratio ranges from 15 to 300.

13. The process of claim 1, wherein said heteroatom is a single-membered bridging unit selected from the group consisting of $-CR_2-$, $-O-$, $-S-$, $-SO-$, $-Se-$, $-SeO-$, $-NR^6-$, $-PR^6-$, $-AsR^6-$, $-BR^6-$, $-AlR^6-$, $-SiR^6_2$, $-GeR^6_2$, and $-SNR^6_2-$, or a multi-membered bridging unit selected from the group consisting of $-(CR^6_2)_2-$, $-SS-$, $-SeSe-$, $-SiR^6_2SiR^6_2-$, $-SiR^6_2CR^6_2-$, $-(CR^6_2)_3-$, $-(CR^6_2)_4-$, $-SiR^6_2 OSi^6_2R-$, $-AlR^6OAlR^6-$, or $-SiR^6_2(CR^6_2)_nSiR^6_2-$, $-SiR^6_2(CR^6_2)_n-$, $-S(CR^6_2)_nS-$, $-S(CR^6_2)_n-$, $-NR^6-(CR^6_2)_nNR^6-$, $-NR^6(R^6_2)_n-$, $-PR^6(CR^6_2)PR^6-$, and $-PR^6(CR^6_2)_n-$ where n=1 or 2, and $R^6$ is hydrogen, a $C_1$-$C_{10}$ alkyl group, a $C_6$-$C_{10}$ aryl group, a $C_2$-$C_{10}$ alkenyl group, a $C_7$-$C_{40}$ aralkyl group, a $C_8$-$C_{40}$ aralkenyl group or a halogen.

14. The process of claim 13, wherein said $R^6$ is a $C_1$-$C_4$ alkyl group, a $C_6$-$C_8$ aryl group, a $C_2$-$C_4$ alkenyl group, a $C_7$-$C_{10}$ aralkyl group, a $C_8$-$C_{12}$ aralkenyl group, a chlorine or bromine.

* * * * *